June 6, 1950  H. P. WILLIAMS  2,510,160
RADIO SYSTEM FOR GUIDING AIRCRAFT
Filed May 28, 1945
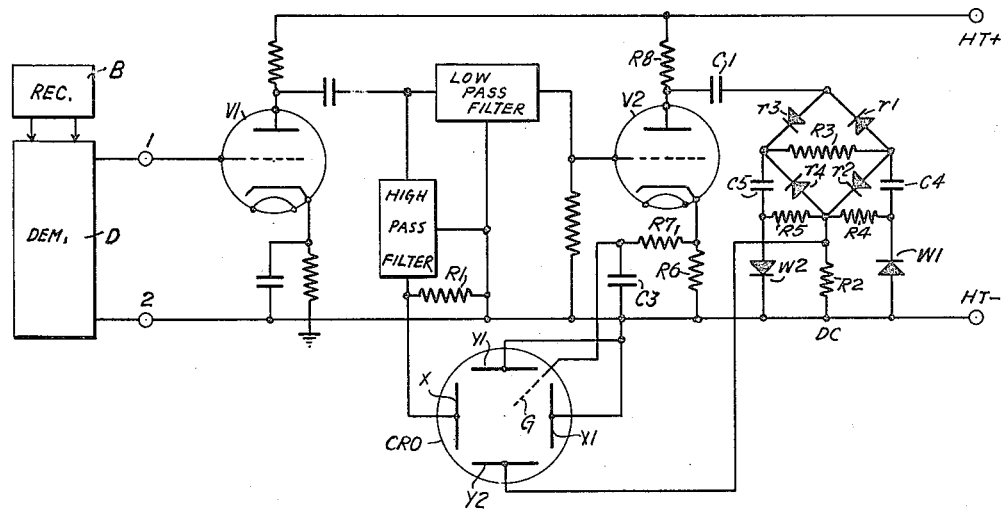
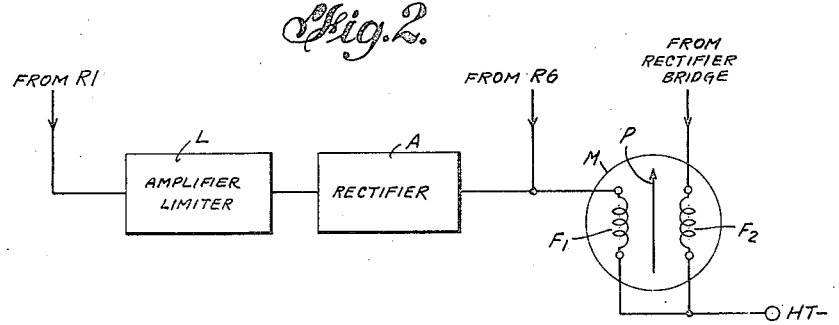
INVENTOR
HERBERT P. WILLIAMS
BY
ATTORNEY

Patented June 6, 1950

2,510,160

UNITED STATES PATENT OFFICE 2,510,160

RADIO SYSTEM FOR GUIDING AIRCRAFT

Herbert Paul Williams, London, England, assignor, by mesne assignments, to International Standard Electric Corporation, New York, N. Y., a corporation of Delaware Application May 28, 1945, Serial No. 596,144
In Great Britain May 11, 1944

Section 1, Public Law 690, August 8, 1946
Patent expires May 11, 1964

8 Claims. (Cl. 343—110)

The present invention relates to means for indicating faults in radio navigational systems.

The navigational systems with which the present invention is concerned are of the kind in which distinguishable overlapping beams of waves are radiated from fixed stations. These overlapping beams define a course for a moving vehicle such as aircraft (or a ship) which carries a receiver provided with means controlled by the relative strengths of the overlapping beams of received waves for indicating the departure from the prescribed course.

In the case of aircraft, such a system may provide a glide path, or an approach path, or both combined. While in the above definition of the navigational system the radiating stations are stated as "fixed," this also includes the case where mobile ground transmitters are used whose positions may be changed from time to time but which are fixed in the sense that they do not move about while they are defining the course.

In these systems, when the moving vehicle is on the course, the overlapping beams produce equal amplitudes in the receiver so that the corresponding indicator gives a null or zero reading. It is important to note that complete absence of signals also produces a zero reading.

For this reason, the receivers in such system are frequently provided with some kind of fault indicator which advises the pilot when there is some failure in the system which renders the course indications incorrect. As will be made clear below, the present invention is concerned with means for causing the course indicator to act also as the fault indicator, so that no additional fault indicating means is required. There is thus no possibility of overlooking the fault indication. The word "fault" signifies any defect in the transmitting or receiving apparatus of the system which tends to produce a disappearance of the indicating signals, and includes the case in which by some accident the transmitters at the ground station have failed to be switched on. Without a fault indicator the pilot of the moving vehicle cannot tell whether a zero indication means that he is on the prescribed course or whether it means that the navigation system has failed somewhere.

The present invention accordingly provides a receiver for a radio navigational system of the kind described comprising means for receiving waves modulated by course indicating signals, a plurality of signal translating stages, means for applying the received waves to the said stages, means for applying the translated signals to control an indicator for indicating departures from a prescribed course, and means for applying one or more of the said stages to control the said indicator in such manner that it also indicates the presence of a fault in the said system or receiver.

A particular embodiment of the invention will be described with reference to the accompanying drawings in which—

Fig. 1 shows a schematic circuit diagram of the fault indicating arrangement in a navigational receiver according to the invention.

Fig. 2 shows a schematic circuit diagram of the fault indicating arrangement utilizing a current indicating meter.

In the particular glide path indicating system employed to illustrate the invention, transmitters on the ground radiate two overlapping beams of waves modulated with a low frequency wave or tone (for example 500 cycles per second) according to interlocking dot-dash signals, so that the pilot receives a continuous tone when he is on the proper glide path, and receives dot or dash tone signals according as he is above or below the path. In this well-known system, the pilot may observe the signals by means of telephones or discriminating apparatus may be provided so that the course is visually indicated on an instrument of some kind such as a meter, or a cathode ray oscillograph. In the latter case the instrument may give a zero reading not only when the pilot is on the proper course, but also when the transmitting or receiving equipment has failed to function, and it has therefore been the practice to provide some kind of additional warning indicator such as a neon tube which fails to glow if something is wrong. It has been found difficult to ensure that every part of the apparatus likely to fail is covered by the warning indicator, and the warning indicator itself or the operating arrangements therefore may become faulty; and failure to give the warning would be serious. Thus in the present invention no additional warning indicator is employed, but the glide path indicator itself is caused to show the presence of a fault in the equipment right up to and including the last low frequency stage.

Fig. 1 of the accompanying drawing shows a schematic circuit diagram of the low frequency stages of a glide path indicating equipment. The dot or dash modulated waves are received and demodulated in B and D respectively to recover the original dot or dash modulating signals, which have a low frequency of perhaps 10 cycles per second, for example, and these signals are applied to a two-stage low frequency amplifier comprising the valves $V_1$ and $V_2$.

The dot or dash signals applied to the valve $V_1$ will usually be accompanied by a considerable amount of superposed ripple at the 500 cycle tone frequency owing to incomplete filtering in the preceding demodulating stages (not shown), and the two valves are accordingly coupled through a low pass filter LPF which may cut off at 200 cycles, for example, in order to remove the ripple.

The dot or dash signals freed from the ripple are amplified by $V_2$ and applied to a discriminating circuit DC of known type which produces across the resistance $R_2$ a continuous voltage depending in magnitude on the amplitude of the signals and in sign on whether they are dots or dashes. This voltage is applied to an indicator, as for example, between the vertically deflecting plates $Y_1$ and $Y_2$ of a cathode ray oscillograph CRO of any suitable pattern including a control grid G for controlling the cathode beam. The ripple voltage across the input of the low pass filter LPF is applied between the horizontally deflecting plates $X_1$ and $X_2$ of the oscillograph through a high pass filter HPF terminated by a resistance $R_1$ or through any suitable tuned circuit or other arrangement which will substantially eliminate the 10 cycle signal frequency waves. The plates $X_1$ and $Y_1$ are both connected to earth as shown.

The valve $V_2$ is biased by means of the cathode resistance $R_6$. The positive potential of the cathode is applied through a smoothing circuit $R_7C_3$ to the control grid G of the oscillograph, and the conditions of operation of the oscillograph are so chosen that the cathode beam is suppressed unless the normal cathode current is present in $R_6$.

A particular discrimination circuit DC of known type has been illustrated as an example; but any suitable type may be employed as this is immaterial as regards the present invention. The discriminator circuit as shown in the drawing comprises four rectifiers $r_1 \ldots r_4$ connected as shown, the output circuit of the amplifier valve $V_2$ being in series with the resistance $R_2$ across one diagonal of the bridge. The bridge rectifier works into the load resistance $R_3$ and the direct current is removed by the two equal condensers $C_4$ and $C_5$ in conjunction with the equal resistances $R_4$ and $R_5$ respectively. Thus when dot and dash signals are obtained one on each side of the approach path after demodulation from the radio carrier, the unrectified signals pass through the bridge and develop a corresponding voltage across $R_2$ the voltage varying according to whether dots or dashes prevail in the received signal. A rectified portion of the dot and dash signals is developed across $R_4$ and $R_5$ respectively. The two resistors $R_4$ and $R_5$ are connected in push-pull fashion to a differential rectifier $W_1$ and $W_2$. The resistance $R_2$ is preferably adjusted to such a value that the voltage across it has approximately the same amplitude as that developed across each resistor $R_4$ and $R_5$. Thus one rectifier $W_1$ receives the difference between the voltage across $R_2$ and that across the resistor $R_4$ and the other of the two rectifiers $W_2$ receives the sum of the voltages across $R_2$ and its associated resistor $R_5$. Thus the resultant voltage developed across $R_2$ comprises a series of pulses that will be in one direction or the other according to whether dots or dashes prevail in the received signal. This resultant voltage developed across resistance $R_2$ can then be applied to an indicator. When on the approach path a signal of constant amplitude or continuous dash is received, and the rectifier system is not energized since the filter formed by $R_6$ and $C_1$ does not pass any direct current, and hence no deflection of the indicator can occur.

The remaining elements of Fig. 1 will be recognised as conventional auxiliaries for the valves and do not need detailed explanation.

It will be clear that the ripple voltage which appears across $R_1$ will produce a corresponding horizontal deflection of the spot on the screen of the cathode ray oscillograph; if the deflection should be insufficient, an amplifier of any appropriate type (not shown) may be inserted before or after $R_1$. This is however, unlikely to be necessary as there is generally plenty of ripple. If the pilot is on the proper glide path, the indication on the screen will therefore be a horizontal straight line at the centre of the screen (provided that the signal frequency is efficiently removed by the filter HPF or equivalent arrangement), there being no voltage across $R_2$. As soon as the pilot goes off the course, the horizontal line will move vertically up or down, as the beam is deflected by the corresponding voltage appearing across $R_2$. Should there be any failure in any part of the system up to and including the valve $V_1$, the ripple will disappear, and the pilot will see only a spot on the screen instead of a horizontal line, and will be immediately advised of the fault.

If, however, the valve $V_2$ should fail, the disappearance of the cathode current in $R_6$ will suppress the beam and extinguish the spot altogether, so that the pilot is immediately aware of the fault.

It is evident that the 10 cycle signal frequency will appear across the resistance $R_6$, so the smoothing arrangement of $R_7$ and $C_3$ should efficiently remove this, or the spot may be intermittent or may vary periodically in brightness. This can be done satisfactorily with $C_3$ equal to about 1 microfarad if $R_7$ is about ½ megohm. It is to be noted that as the signal amplitude increases when the pilot gets further away from the course, the cathode current through $R_6$ will tend to increase, so that the brightness of the spot will also tend to increase. This effect is by no means undesirable as it tends to emphasize that the pilot is well off the course.

Although it has been assumed that the indicator for the glide path system is a cathode ray tube the invention may be adapted by minor modifications to enable a milliammeter type of indicator to give a suitable indication of a fault as shown in Fig. 2. The meter used is usually of the centre zero type, and the needle indicates zero when the pilot is on the course. It is proposed that a meter M with two windings should be used, one of which is the usual operating winding $F_1$ and the other a bias winding $F_2$. The ripple voltage appearing across $R_1$ in Fig. 1 is amplified by a limiting valve L to keep the output level independent of the input level, and is then rectified by A so that a continuous voltage of the proper sign is obtained and is added to the voltage obtained across $R_6$ and applied to the bias winding, thereby bringing the needle P up to the centre zero when there is no output from the discriminator. The meter then behaves just like the conventional instruments as regards the operating winding, but should either the ripple, or the cathode current of $V_2$, or both fail, then it can be arranged so that the needle disappears behind a screen or moves right out of the normal range of indication, whereby the pilot is warned of a fault.

It will be evident that although the apparatus which has been described as a glide path indicator, exactly the same warning arrangements could be applied to an azimuth indicating system or to a combined system. Furthermore, the invention is not confined to the use of the particular conditions and frequencies specified for illustration, nor to the use of exactly the elements indicated. Thus, the valves do not necessarily have to be triodes; and if pentodes are used, for example, the usual auxiliary polarizing arrangements for the extra grids may be provided in any suitable way.

What is claimed is:

1. A receiver for a radio navigational system of the kind described comprising means for receiving and demodulating carrier waves modulated with modulating waves according to interlocking course indicating signals, a low frequency amplifier for the said demodulated signals, an indicator, means for applying the amplified signals to control said indicator for indicating departure from a prescribed course, and means for deriving said modulating waves exclusive of said signals and carrier waves from a stage or stages of the said amplifier forces for controlling the said indicator in such manner that it also indicates the presence of a fault in the said amplifier or in some preceding part of the said receiver or system.

2. A receiver for a radio navigational system of the kind described comprising means for receiving and demodulating waves modulated by course indicating signals, a low frequency amplifier for the demodulated signals, a cathode ray oscillograph having a control electrode, means for polarising the said electrode so as normally to suppress the beam, means for deriving a unidirectional voltage from a stage of the said amplifier and for applying the said voltage to the said electrode so as to release the beam, and means for applying the amplified signals to deflect the beam for the purpose of indicating departures from a prescribed course.

3. A receiver for a radio navigational system of the kind described comprising means for receiving and demodulating waves modulated by dot-dash course indicating tone signals, a low frequency amplifier for the demodulated dot-dash signals, a cathode ray oscillograph, means for applying the amplified signals to deflect said cathode ray oscillograph beam in one direction for indicating departures from a prescribed course, and means for applying the tone frequency ripples at the output of a stage of the amplifier to produce a straight line deflection of the beam perpendicular to the first mentioned direction.

4. A receiver according to claim 3 comprising a cathode ray tube having a control electrode, means for polarising the said electrode so as normally to suppress the beam, and means for deriving a unidirectional voltage from another stage of the said amplifier and for applying the said voltage to the said electrode so as to release the beam.

5. A receiver according to claim 4 in which the said amplifier comprises two thermionic valve amplifying stages, the tone frequency ripples being derived from the output of the first valve and the unidirectional voltage from the second valve.

6. A receiver according to claim 5 in which the said unidirectional voltage is derived from a resistance connected in series with the cathode of the second valve.

7. A receiver according to claim 5 in which the said two stages are coupled by a low pass filter adapted to suppress the said tone frequency ripples.

8. A receiver according to claim 3 in which the said means for applying the tone frequency ripples to the cathode beam comprises means for suppressing the dot-dash signal waves.

HERBERT PAUL WILLIAMS.

REFERENCES CITED

The following references are of record in the file of this patent:

UNITED STATES PATENTS

| Number | Name | Date |
|---|---|---|
| 2,137,123 | Lewis et al. | Nov. 15, 1938 |
| 2,255,484 | Dome | Sept. 9, 1941 |
| 2,284,219 | Loughren | May 26, 1942 |
| 2,334,247 | Busignies | Nov. 16, 1943 |
| 2,393,624 | Ferrill, Jr. | Jan. 29, 1946 |